United States Patent
Tellado et al.

(10) Patent No.: US 7,782,852 B2
(45) Date of Patent: Aug. 24, 2010

(54) MULTIPLE MODULATION RATE 10GBASE-T TRANSMISSION

(75) Inventors: Jose Tellado, Palo Alto, CA (US); Sanjay Kasturia, Palo Alto, CA (US)

(73) Assignee: Teranetics, Inc., San Jose, CA (US)

( * ) Notice: Subject to any disclaimer, the term of this patent is extended or adjusted under 35 U.S.C. 154(b) by 834 days.

(21) Appl. No.: 11/247,805

(22) Filed: Oct. 11, 2005

(65) Prior Publication Data
US 2007/0081475 A1    Apr. 12, 2007

(51) Int. Cl.
*H04L 12/56* (2006.01)
(52) U.S. Cl. .................................. 370/391; 370/333
(58) Field of Classification Search ................ 370/278, 370/277, 529, 201, 391, 333; 455/296, 132, 455/429; 714/758, 792; 379/93; 375/240, 375/219, 285; 369/103
See application file for complete search history.

(56) References Cited

U.S. PATENT DOCUMENTS

| | | | |
|---|---|---|---|
| 5,134,464 A | 7/1992 | Basile et al. | |
| 6,154,489 A | 11/2000 | Kleider et al. | |
| 6,317,418 B1 * | 11/2001 | Raitola et al. | 370/278 |
| 6,370,202 B1 * | 4/2002 | Wolcott | 375/295 |
| 6,385,462 B1 | 5/2002 | Baum et al. | |
| 6,574,773 B1 * | 6/2003 | Turk et al. | 714/792 |
| 6,584,159 B1 * | 6/2003 | Azadet et al. | 375/285 |
| 6,628,704 B1 * | 9/2003 | Long et al. | 375/219 |
| 6,683,916 B1 | 1/2004 | Sartori et al. | |
| 6,687,235 B1 | 2/2004 | Chu et al. | |
| 6,744,814 B1 | 6/2004 | Blanksby et al. | |
| 6,785,341 B2 | 8/2004 | Walton et al. | |
| 2001/0050926 A1 * | 12/2001 | Kumar | 370/529 |
| 2003/0016797 A1 * | 1/2003 | Zakrzewski et al. | 379/93.32 |
| 2003/0027568 A1 * | 2/2003 | Berger | 455/429 |
| 2003/0134607 A1 * | 7/2003 | Raghavan et al. | 455/132 |
| 2003/0235245 A1 | 12/2003 | Erdogan et al. | |
| 2005/0174926 A1 * | 8/2005 | Barrass | 370/201 |
| 2005/0186933 A1 * | 8/2005 | Trans | 455/296 |
| 2005/0271139 A1 * | 12/2005 | Ungerboeck et al. | 375/240 |
| 2006/0077852 A1 * | 4/2006 | Tateishi et al. | 369/103 |
| 2006/0156179 A1 * | 7/2006 | Shen et al. | 714/758 |

OTHER PUBLICATIONS

Zhou, Giannakis, "Adaptive Modulation for Multiantenna Transmission with Channel Mean Feedback", Sep. 2004, IEEE Transactions on Wireless Communications, vol. 3, No. 5.
Ericsson et al., Hybrid typ-II ARQ/AMS supported by Channel Predictive Scheduling in a Multi-User Scenario, IEEE Vehicular Technology Conference, Sep. 24-28, 2000, pp. 1804-1811.

* cited by examiner

*Primary Examiner*—Steven H Nguyen
*Assistant Examiner*—Syed Bokhari
(74) *Attorney, Agent, or Firm*—Brian R. Short

(57) ABSTRACT

A device and method of high-speed transmission is disclosed. The method includes computing a signal quality of a received signal, the received signal being transmitted with a modulation order required by a default transmission modulation format. The signal quality is compared with a signal quality threshold required of the default transmission modulation format. If the signal quality is below the signal quality threshold, an indication of a level of signal quality failure is provided to a transmitter. The transmitter sets a number of uncoded bits within the transmission signal based upon the level of signal quality failure.

37 Claims, 7 Drawing Sheets

US 7,782,852 B2

MULTIPLE MODULATION RATE 10GBASE-T TRANSMISSION

FIELD OF THE INVENTION

The invention relates generally to communication systems. More particularly, the invention relates to an apparatus and method for adaptive modulation 10Gbase-T transmission.

BACKGROUND OF THE INVENTION

High-speed networks are continually evolving. The evolution includes a continuing advancement in the operational speed of the networks. The network implementation of choice that has emerged is Ethernet networks physically connected over unshielded twisted pair wiring. Ethernet in its 10BASE-T form is one of the most prevalent high speed LANs (local area network) for providing connectivity between personal computers, workstations and servers.

High-speed LAN technologies include 100BASE-T (Fast Ethernet) and 1000BASE-T (Gigabit Ethernet). Fast Ethernet technology has provided a smooth evolution from 10 Megabits per second (Mbps) performance of 10BASE-T to the 100 Mbps performance of 100BASE-T. Gigabit Ethernet provides 1 Gigabit per second (Gbps) bandwidth with essentially the simplicity of Ethernet. There is a desire to increase operating performance of Ethernet to even greater data rates.

FIG. 1 shows a block diagram of an Ethernet transceiver pair communicating over a bi-directional transmission channel, according to the prior art. The transceiver pair includes a first transceiver 100 and a second transceiver 105. The first transceiver 100 includes a transmitter section 110 that transmits digital data over a transmission channel 135 to a receiver section 160 of the second transceiver. The first transceiver also includes a receiver section 120 that receives data from the transmitter section of the second transceiver 105. The transmission channel can be four twisted pairs of copper wire.

An implementation of high speed Ethernet networks includes simultaneous, full bandwidth transmission, in both directions (termed full duplex), within a selected frequency band. When configured to transmit in full duplex mode, Ethernet line cards are generally required to have transmitter and receiver sections of an Ethernet transceiver connected to each other in a parallel configuration to allow both the transmitter and receiver sections to be connected to the same twisted wiring pair for each of four pairs.

10GBase-T Ethernet systems require a level of signal to noise/interference performance to properly operate. If the signal to noise/interference is below the required level, typically, a 1000Base-T system is automatically switched to by default. The 1000Base-T system requires a completely different set of processing circuits for transmission of data. This results in the use of additional transmission circuitry, and a much lower data rate than the transmission channel can provide.

FIG. 2 shows a prior art Ethernet configuration that includes 10GBase-T, 1000Base-T and 100Base-T circuitry. Essentially, a single transceiver supports all of the different Ethernet protocols. This includes all transmitter and receiver processing circuitry for all the different protocols. This configuration is inefficient for several reasons. First of all, this configuration requires all the processing circuitry of all the different protocols. That is, there is minimal overlap in the use of the circuitry required for each of the different protocols. Additionally, the protocol that is used is selected based upon the level of transmission signal quality. That is, if a signal quality is below the 10GBase-T protocol, then the 1000Base-T protocol is used. The protocol is automatically switched to a 1000Base-T protocol which provides a data transmission rate ten times as slow. In fact, the transmission channel may be able to support a data transmission rate that is substantially greater. The result is slower data transmission than the transmission channel can support.

It is desirable to optimize the data transmission rate of high-speed Ethernet network connections. It is additionally desirable to minimize the electronic circuitry required to support the data transmission.

SUMMARY OF THE INVENTION

An embodiment of the invention includes a method of high-speed transmission. The method includes computing a signal quality of a received signal, the received signal being transmitted with a modulation order required by a default transmission modulation format. The signal quality is compared with a signal quality threshold required of the default transmission modulation format. If the signal quality is below the signal quality threshold, an indication of a level of signal quality failure is provided to a transmitter. The transmitter sets a number of un-coded bits within the transmission signal based upon the level of signal quality failure.

Another embodiment includes a method of 10GBase-T transmission. The method includes initiating a 10GBase-T training sequence and computing a signal quality of a received signal based upon the 10GBase-T training sequence. The signal quality is compared with a signal quality threshold required of the 10GBase-T transmission. If the signal quality is below the signal quality threshold, an indication of a level of signal quality failure is provided to a transmitter. The transmitter sets a number of un-coded bits within the transmission signal based upon the level of signal quality failure.

Other aspects and advantages of the present invention will become apparent from the following detailed description, taken in conjunction with the accompanying drawings, illustrating by way of example the principles of the invention.

DETAILED DESCRIPTION

The invention includes an apparatus and method for high-speed data transmission. A transmission signal quality is used to determine the rate of data transmission. A default protocol is used, and a number of un-coded transmission bits is set within the default protocol depending upon the level of transmission signal quality.

Figure 1:
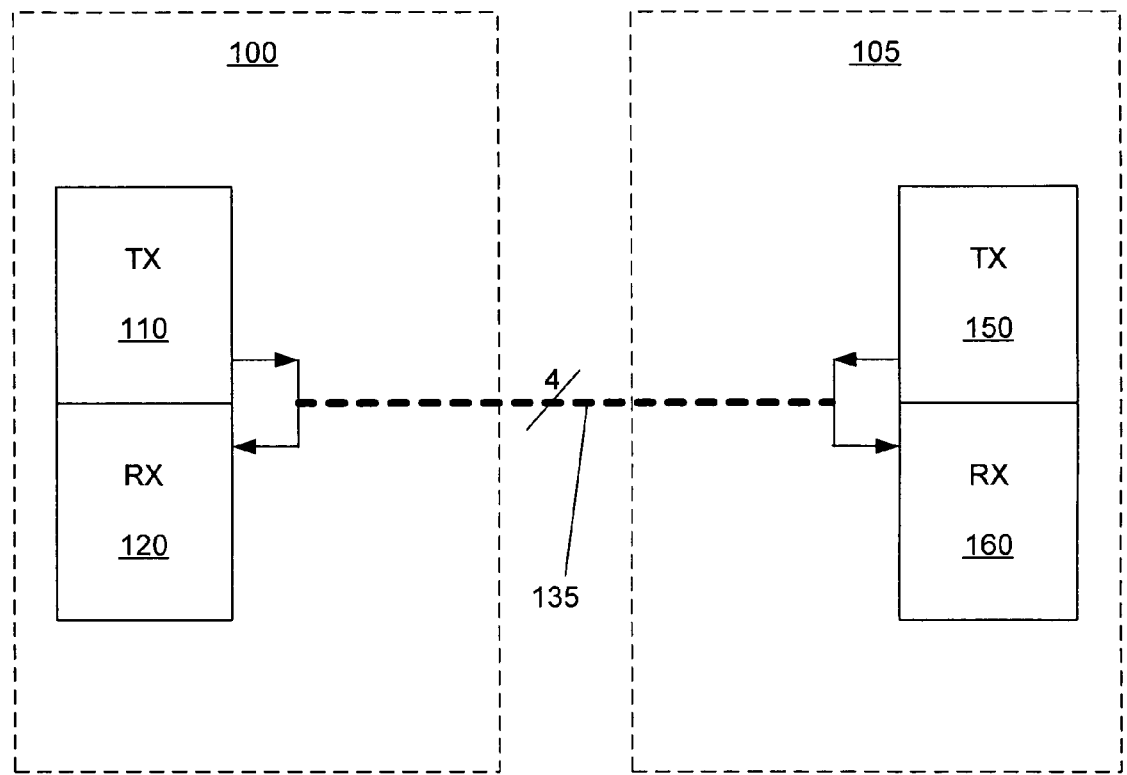
FIG. 1 shows a prior art pair of Ethernet transceivers.
Figure 2:
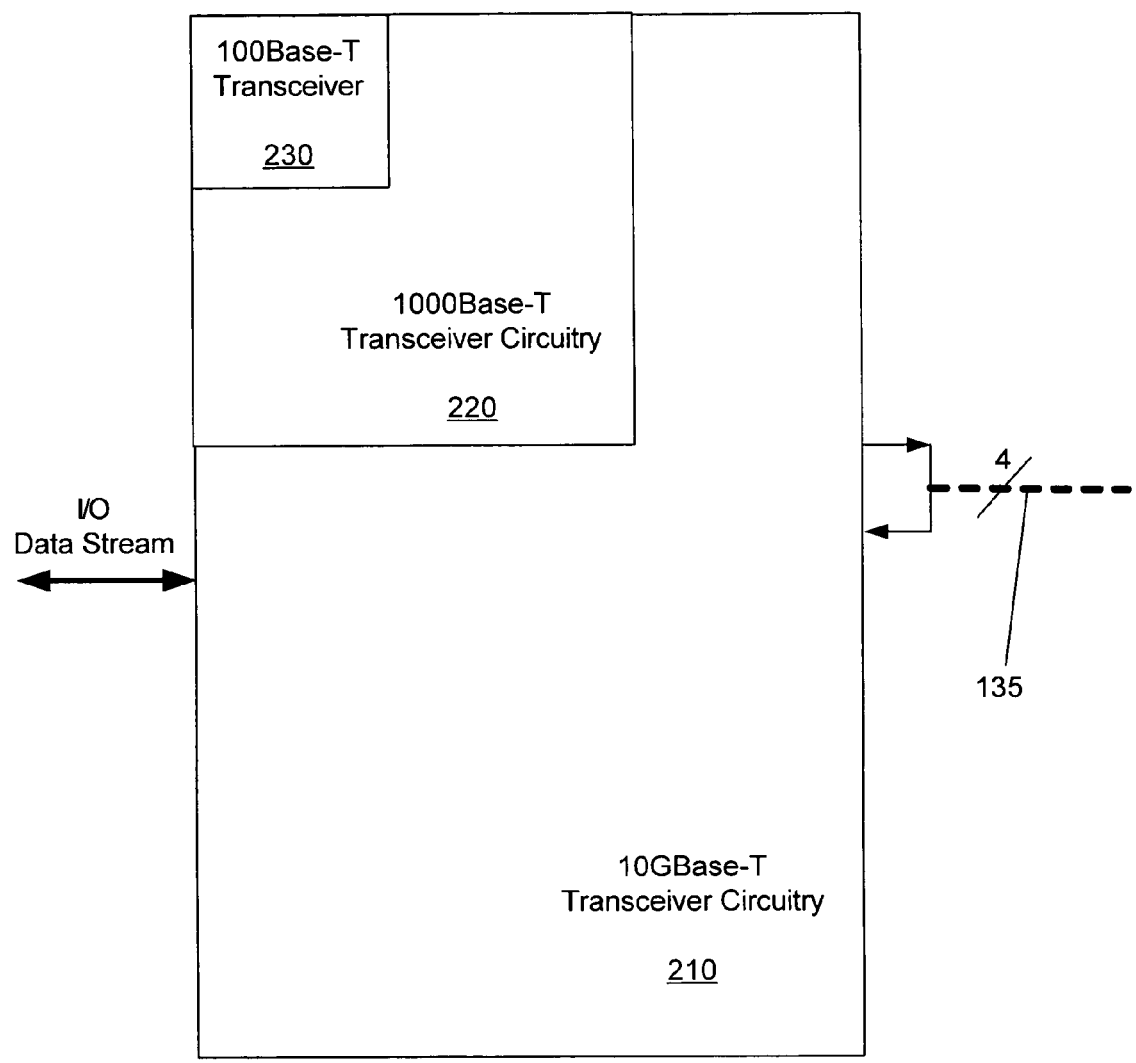
FIG. 2 shows a prior art configuration that includes 10GBase-T, 1000Base-T and 100Base-T circuitry.
Figure 3:
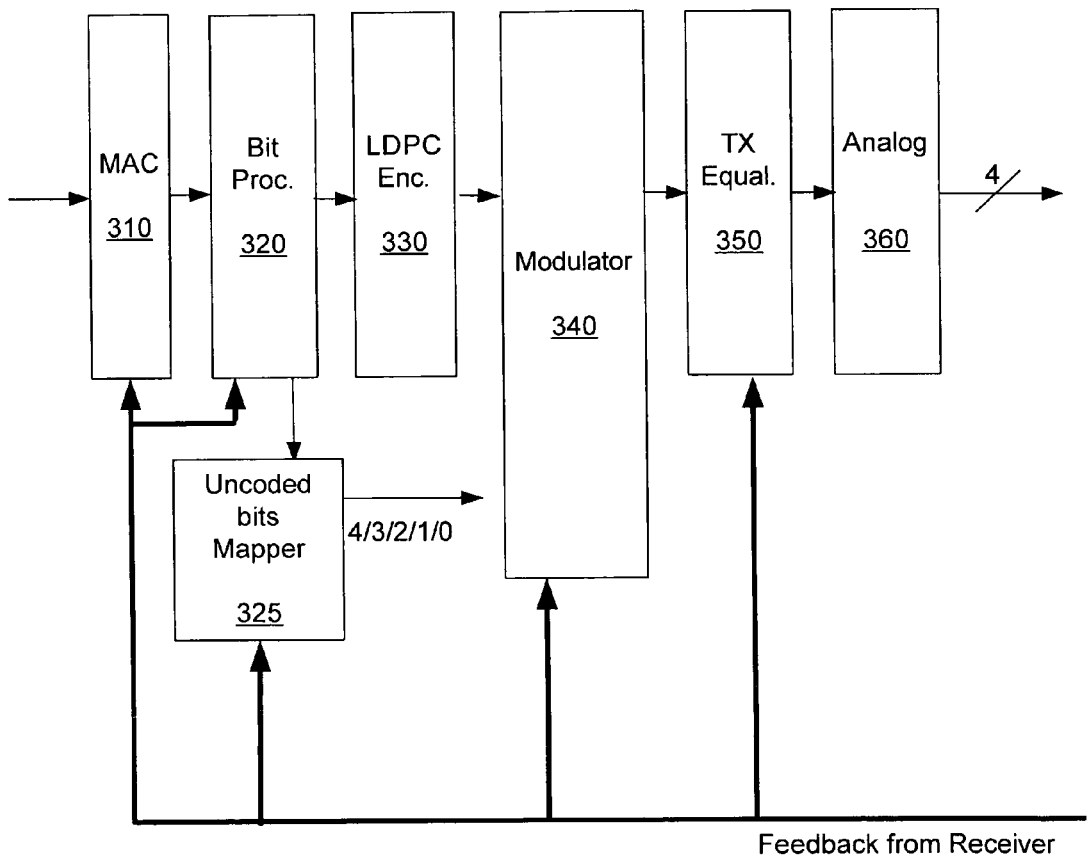
FIG. 3 shows an Ethernet transmitter that includes un-coded bit adjustments depending upon a quality of transmission.

FIG. 3 shows an Ethernet transmitter that includes un-coded bit adjustments depending upon a quality of transmission. The transmitter includes a media access control (MAC) 310, a bit processor 320, an encoder 330, a modulator 340, a transmission equalizer 350, an un-coded bits mapper 325 and an analog output section 360. The Ethernet transmitter operates with a default transmission protocol, such as, 10GBase-T transmission. If signal quality of transmission signals of the transmission channel are below a threshold level required for the default protocol, a number of un-coded bits is deceased, resulting in a lower transmission data rate. However, the transmission does not automatically change to a completely different protocol. A large percentage of the circuitry is reused for each of the available data rates because a transmission symbol rate is constantly maintained.

The MAC 310 receives raw data bits, and schedules the bits for transmission. The data rate of the MAC 310 is increased or deceased depending upon the number of un-coded bits. The MAC 310 acts as a data bit flow control mechanism.

The scheduled bits of the MAC 310 are pre-transmission processed by the bit processor 320. The pre-transmission processing can include, for example, scrambling, interleaving, cyclic redundancy checking (CRC) or formatting of the data bits. The bit processor can also add optional physical layer (PHY) control bits.

A set of un-coded bits are separated after the bit processing. The number of un-coded bits is determined by the quality of the transmission signals as determined by a receiver of the transmission data bits. The other bits are encoded by the encoder 330. An exemplary encoder is a forward error correction encoder, more specifically, an LDPC encoder.

A mapper 325 provides mapping of the un-coded bits.

A modulator 340 modulates the combination of the encoded bits and the un-coded bits. The modulator 340 can include many different modulation formats, such as, DSQ128, QAM64, PAM8, QAM16 or PAM4. The modulation type is at least partially determined by the number of un-coded bits. The modulator can include a four dimensional modulator. The four dimensions can include two separate two-dimensional modulators, or four one-dimensional modulators. For example, the four dimensional modulator can include two QAM or DSQ two dimensional modulators, or four PAM one-dimensional modulators. The modulator can also be a two-dimensional modulator as provided by a single QAM symbol or two PAM symbols.

For a 10GBase-T system, the modulator generates four streams of modulated bit streams for transmission over four copper wires. One embodiment includes two-dimensional DSQ or QAM symbols being transmitted over two wires (a first component on one wire, and the second component on the other wire), or over a single wire as two consecutive one-dimensional symbols. One-dimensional symbols can be transmitted over a single wire.

Each of the four symbol streams generated by the modulator 340 is additionally processed by the transmission equalizer 350 and the analog output section 360. The equalizer 350 provides phase and amplitude pre-processing to mitigate phase and amplitude effects of the transmission channel. The equalizer 350 generally provides phase and amplitude processing that partially inverts the phase and amplitude response of the transmission channel. An exemplary equalizer 350 is a Tomlinson-Harashima pre-equalizer. The analog output section 360 includes a D/A, and analog signal processing.

The transmitter of FIG. 3 can provide 10GBase-T transmission in which the number of un-coded bits utilized during transmission is varied depending upon a quality of the signal transmission. An exemplary embodiment includes a 10GBase-T training sequence being initiated. The receiver of the training sequence computes a signal quality of a received signal based upon the 10GBase-T training sequence. The computed signal quality is compared with a signal quality threshold required of the 10GBase-T transmission. If the signal quality is below the signal quality threshold, an indication of a level of signal quality failure is provided to a transmitter. The transmitter sets a number of un-coded bits within the transmission signal based upon the level of signal quality failure.

Signal Quality

Signal quality is generally determined by the receiver of the transmission signals. The signal quality, as will be described, can be represented as an SNR, DPSNR (decision point signal to noise ratio), DPMSE (decision point mean square error), DPPER (decision point peak error rate), BER (bit error rate), FER (frame error rate), received error probability density function (pdf) distribution, or decision point signal to decision point cross talk ratio of the received signal.

Signal Quality Threshold

The various transmission protocols generally require a certain level of signal quality to ensure proper transmission of the signals. The level of signal level quality is dependent on several factors, such as, the number of modulation levels, FEC coding gain, noise and crosstalk levels, and the bit or packet error rate target of the desired application. For example, a 10GBase-T system typically requires a signal quality of greater than 23 dB of SNR for DSQ 128 in the presence of additive white Gaussian noise at the input of the LDPC decoder. For other types of noise and/or error signals, the target signal quality is different. If the signal quality is below this threshold, then the data rate (symbol rate) is typically decreased.

Un-Coded Bits

Un-coded bits are transmission bits that do not pass through an FEC encoder before transmission. The number of un-coded bits controls a density of the modulator, and therefore, the type of transmission symbol.

Level of Failure

An amount that transmission signals fall below the required signal quality can be termed "level of failure". Based upon the level of failure, the data rate can be reduced by a certain amount. For example, the level of failure can be 3 db, requiring a halving of the number of modulation points in a two-dimensional symbol such as QAM or DSQ symbols. Though most of the descriptions include reducing the number of un-coded bits, the described embodiments can also include increasing the number of un-coded bits based upon the signal quality of the transmission signals. Equivalent margins of signal quality better than a predetermined threshold can include increasing the number of un-coded bits by an equivalent amount.

One exemplary embodiment includes the number of un-coded bits being 3 bits per two-dimensional modulation symbol if the signal quality is not less than the signal quality threshold, and is reduced by at least ½ bit per modulation symbol dimension if the signal quality is less than the signal quality threshold, and reduced by another ½ bit per modulation symbol dimension for every 3 dB the signal quality is below the signal quality threshold. Decreasing ½ bit per modulation symbol dimension can be achieved by reducing from 2*n+1 bits on a two-dimensional modulation symbol to n bits on a one-dimensional modulation symbol.

For a 10GBase-T system, the modulation format of the transmission can be DSQ128 if the signal quality not less than the signal quality threshold required by DSQ128. The modulation format can be QAM64/PAM8 if the signal quality is less than the signal quality threshold of DSQ128 by less than 3 dB. The modulation format can be QAM32/DSQ32 if the signal quality is at least 3 dB but less than 6 dB below the signal quality threshold. The modulation format can be QAM16/PAM4 if the signal quality is at least 6 dB but less than 9 dB below the signal quality threshold. Another embodiment includes the modulation format of the transmission being PAM8 if the signal quality is less than the signal quality threshold by less than 3 dB, and the modulation format being PAM4 if the signal quality is at least 3 dB but less than 9 dB.

Another exemplary embodiment includes the number of un-coded bits being set by decreasing the number of un-coded bits from a default value by ¼ bit per modulation symbol dimension for each 1.5 dB the signal quality is below the signal quality threshold. Decreasing ¼ bit per modulation symbol can be achieved by reducing 1 bit of a four-dimensional modulation symbol.

Another embodiment include the number of un-coded bits being set by decreasing the number of un-coded bits from a default value by 1 bit per modulation symbol dimension for each 6 dB the signal quality is below the signal quality threshold.

In an exemplary embodiment, a receiver computes a desired number of un-coded bits and provides the desired number to the transmitter. Alternatively, the receiver provides a signal quality, and the transmitter determines the number of un-coded bits based upon the signal quality.

For bidirectional transmission, each receiver of bidirectional transmission computes a desired number of un-coded bits for the bidirectional transmission. The smallest desired number of each of both directions of the bidirectional transmission can be selected for transmission in both bidirectional transmission directions.

As previously stated, the signal quality determines the number of un-coded bits. For the transmitter of FIG. 3, the MAC 310, the bit processor 320, the modulator 340 and the transmission equalizer 350, can all be influenced by the number of un-coded bits.

Training Sequences

Transmission is initiated by a default training sequence. The transmitter of FIG. 3 only requires a training sequence of a single transmission protocol, such as, a 10GBase-T training sequence. That is, no other types of training sequences are initiated than the default training sequence. Unlike the prior art that defaults to a different protocol, such as 1000Base-T when the signal quality does not support 10GBase-T transmission, the embodiment of FIG. 3 reduces the transmission data rate by reducing the number of un-coded bits. This is desirable for the reason stated (higher transmission data rates and less support circuitry), but also because initiating multiple training sequences is inefficient.

The initiation of training sequences provides useful information about noise and error distortion of the transmission channel. More specifically, the training sequences provide channel NEXT, FEXT and echo signal characteristics of the transmission channel. An exemplary training sequence includes simple patterns of PAM2 symbols that are transmitted at the symbol rate of 10GBase-T data transmission. A 10GBase-T embodiment includes PAM2 training symbols and DSQ128 data symbols, all transmitted at the same rate of 800 Mega-symbols per second.

The embodiment of FIG. 3 also can provide a transmission symbol rate that remains constant if the number of un-coded bits changes. The transmission data rate is modified by changing the types of symbols being transmitted, while maintaining the same transmission symbol rate. This is desirable because it allows for reuse of a large percentage of the transmitter circuits (and receiver circuits as will be described) while changing the transmission data rate. More specifically, the constant transmission symbol rate allows for reuse of analog processing circuits, encoding circuits, NEXT, FEXT, echo and equalizer circuits while changing the number of un-coded bits and transmission data rate.

Figure 4:
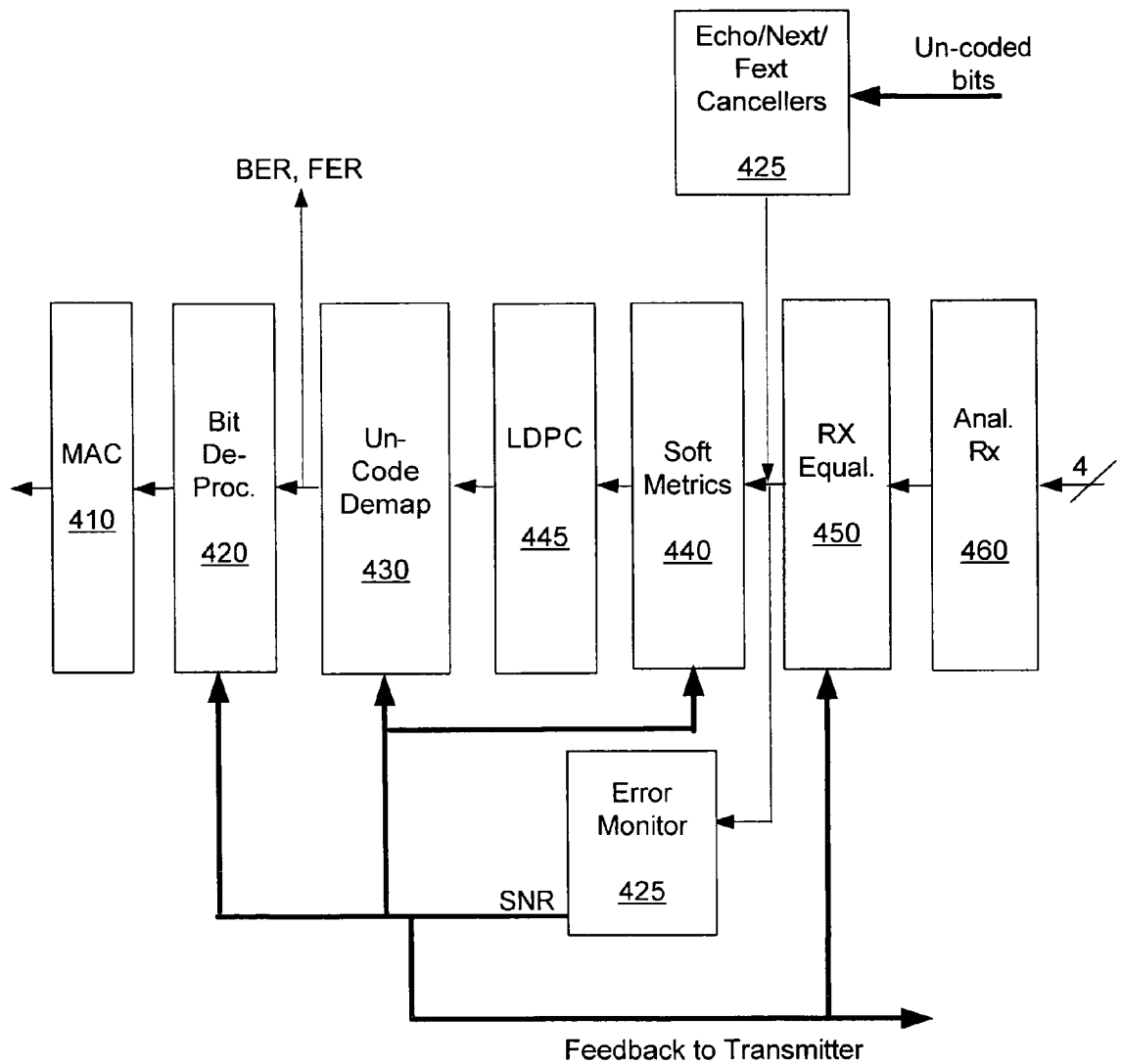
FIG. 4 shows an Ethernet receiver that includes un-coded bit adjustments depending upon a quality of transmission.

FIG. 4 shows an Ethernet receiver that includes un-coded bit adjustments depending upon a quality of transmission. The receiver includes an analog input section 460, a receiver equalizer 450, a soft/hard-metrics section 440, an LDPC decoder 445, a un-coded de-mapper 430, a bit de-processing section 420, and a MAC 410. Echo signal, NEXT signal, and/or FEXT signal cancellation signals of a canceller 425 can be summed with the output signals of the receiver equalizers. A great benefit of this receiver is that as much as 95% of the receiver circuitry can be reused for different transmission rates. Unlike the prior art that changes transmission protocols for different levels of transmission signal quality, the receiver of FIG. 4 modifies the number of un-coded bits which allows for changes in the transmission data rate while maintaining a constant transmission symbol rate.

An error monitor 435 provides an estimate of the transmission signal quality by providing, for example, the SNR of the transmission signals. Other signal quality parameters, such as, BER or FER can be obtained at the output of the un-coded de-mapper 430, the bit de-processor 420. Any of these quality parameters can be used to determine the number of un-coded bits of transmission signals.

The receiver equalizer 450 and the analog circuitry 460 provide analogous functionality as the transmitter equalizer 350 and the analog circuitry 360 of the transmitter of FIG. 3.

The soft/hard-metrics section 440 compares a received signal amplitude and phase with a transmitter modulator output, and generates a weight and/or metric that represents a likelihood of each modulator output.

The LDPC 445 decodes encoded bits from the received signals. The un-coded de-mapper 430 de-maps un-coded bits from the received symbols into a digital bit stream. The MAC 410 and the bit de-processor 420 provide analogous functions as the MAC 310 and bit processor 320 of FIG. 3. The canceller 425 sums error cancellation signals to minimize the effects of FEXT, NEXT and echo distortion of the transmission signals.

An exemplary 10GBase-T receiver operates by receiving a 10GBase-T training sequence from a 10GBase-T transmitter. The receiver computing a signal quality of a received signal based upon the 10GBase-T training sequence. The signal quality is compared with a signal quality threshold required of the 10GBase-T transmission. If the signal quality is below the signal quality threshold, providing an indication of a level of signal quality failure to the transmitter, thereby setting a number of un-coded bits within transmission signals based upon the level of signal quality failure.

Processing of the echo signal, NEXT signal, and/or FEXT signal cancellation signals of a canceller 425 can be controller to some extent by the number of un-coded bits. For example, the number of un-coded bits can be used to set a resolution of coefficients of signal processing of at least one of an equalizer, a cross-talk canceller and an echo canceller. This includes signal processing within both the transmitter and/or the receiver. The number of un-coded bits can also be used to set a number of coefficients of signal processing of at least one of an equalizer, a cross-talk canceller and an echo canceller. Again, this includes signal processing within both the transmitter and/or the receiver.

Figure 5:
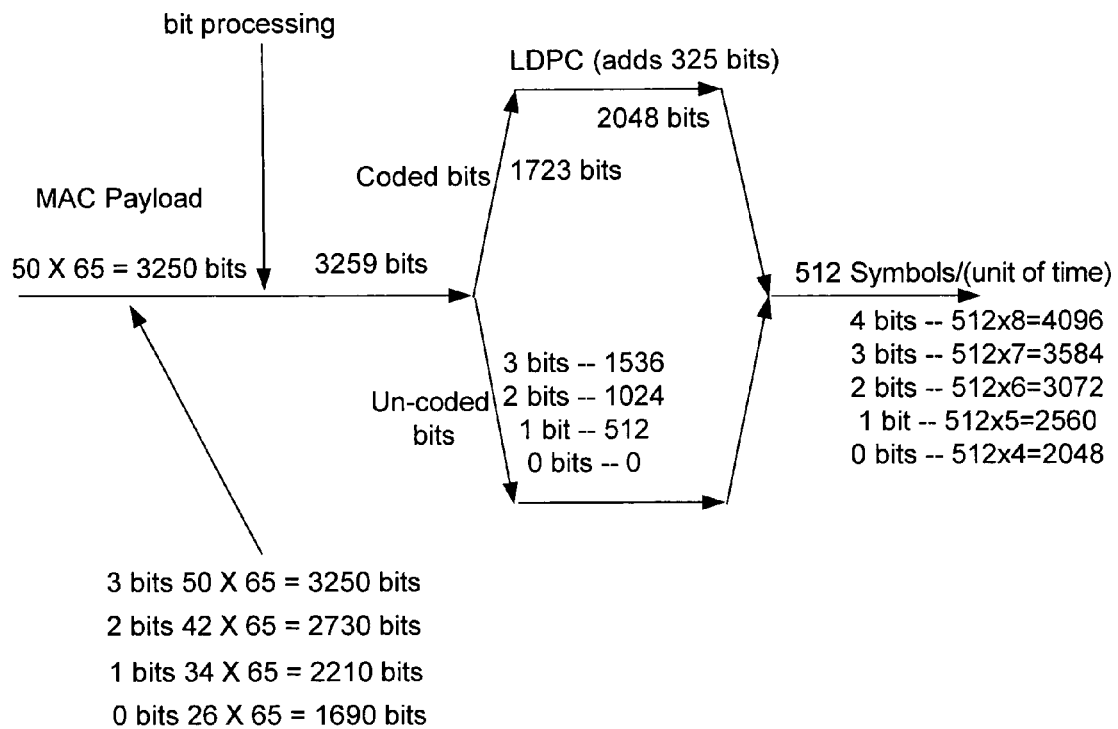
FIG. 5 is a diagram that shows how received signal quality influences the bit allocations of transmission signal.

FIG. 5 is a diagram that shows how received signal quality influences the bit allocations of an exemplary 10GBase-T transmission protocol. As shown, a MAC payload includes 50 blocks of 65 bits, or 3250 bits. Bit processing including 8 CRC bits and an auxiliary bit adds 9 bits, totaling 3259 bits. Of the 3259 bits, 1723 are coded, and the rest of the bits are un-coded. An LDPC encoder adds 325 bits to the total number of coded bit, resulting in 2048 coded bits. With a default of 3 un-coded bits, the number of un-coded bits is 1536. Therefore, the total number of bits is 2048 plus 1526, or 3584 (512×7) bits. With a default DSQ128 transmission symbol (which contains $\log_2(128)=7$ modulated bits), the symbol transmission rate is 512 symbols per unit of time, which equates to 3584 bits per unit of time. An exemplary unit of time is 320 nanoseconds. Transmitting 512 two-dimensional DSQ128 symbols over four wires results in 256 four-dimensional symbols over 320 nanoseconds or 800 4D Mega-symbols/sec (256 symbols/320 nanosecond).

Based upon the transmission signal quality, the number of un-coded bits can be decreased, or increased. The MAC payload and data transmission rate can be varied depending upon the number of un-coded bits. The symbol transmission rate, however, remains constant.

If the signal quality is below the threshold required for 10GBase-T transmission, the number of un-coded bits can be reduced to two. This results in a MAC payload reduction to 42 blocks of 65 bits, or 2730 bits. Bit processing including 8 CRC bits and nine auxiliary bit adds 17 bits, totaling 2747 bits. Of the 2747 bits, 1723 are coded, and the rest of the bits are un-coded. An LDPC encoder adds 325 bits to the total number of coded bit, resulting in 2048 coded bits. With a default of 2 un-coded bits, the number of un-coded bits is 1024. Therefore, the total number of modulated bits is 2048 plus 1024, or 3072 bits. With a default QAM64 (or two PAM8) transmission symbol, the symbol transmission rate is 512 two-dimensional symbols per unit of time, which equates to 3072 modulated bits per unit of time.

If the signal quality is below the threshold required for 10GBase-T transmission with two un-coded bits, the number of un-coded bits can be reduced to one. This results in a MAC payload reduction to 34 blocks of 65 bits, or 2210 bits. Bit processing including 8 CRC bits and 17 auxiliary bit adds 25 bits, totaling 2235 bits. Of the 2235 bits, 1723 are coded, and the rest of the bits are un-coded. An LDPC encoder adds 325 bits to the total number of coded bit, resulting in 2048 coded bits. With a default of 1 un-coded bits, the number of un-coded bits is 512. Therefore, the total number of modulated bits is 2048 plus 512, or 2560 bits. With a default QAM32 transmission symbol, the symbol transmission rate is 512 two-dimensional symbols per unit of time, which equates to 2560 modulated bits per unit of time.

If the signal quality is below the threshold required for 10GBase-T transmission with one un-coded bit, the number of un-coded bits can be reduced to zero. This results in a MAC payload reduction to 26 blocks of 65 bits, or 1690 bits. Bit processing including 8 CRC bits and 25 auxiliary bit adds 33 bits, totaling 1723 bits. Of the 1723 bits, 1723 are coded, and the rest of the bits are un-coded. An LDPC encoder adds 325 bits to the total number of coded bit, resulting in 2048 coded bits. With a default of zero un-coded bits, the number of un-coded bits is zero. Therefore, the total number of modulated bits is 2048 plus zero, or 2048 bits. With a default QAM16 (or two PAM4) transmission symbol, the symbol transmission rate is 512 two-dimensional symbols per unit of time, which equates to 2048 modulated bits per unit of time.

If the signal quality is greater the threshold required for 10GBase-T transmission by a certain amount (for example, 3 dB), the number of un-coded bits can be increased to four. This results in a MAC payload increase to 57 blocks of 65 bits, or 3705 bits. With a default of four un-coded bits, the number of un-coded bits is 2048. Therefore, the total number of modulated bits is 2048 plus 2048, or 4096 bits. With a default QAM256 (or two PAM16) transmission symbol, the symbol transmission rate is 512 symbols per unit of time, which equates to 4096 modulated bits per unit of time.

Figure 6:
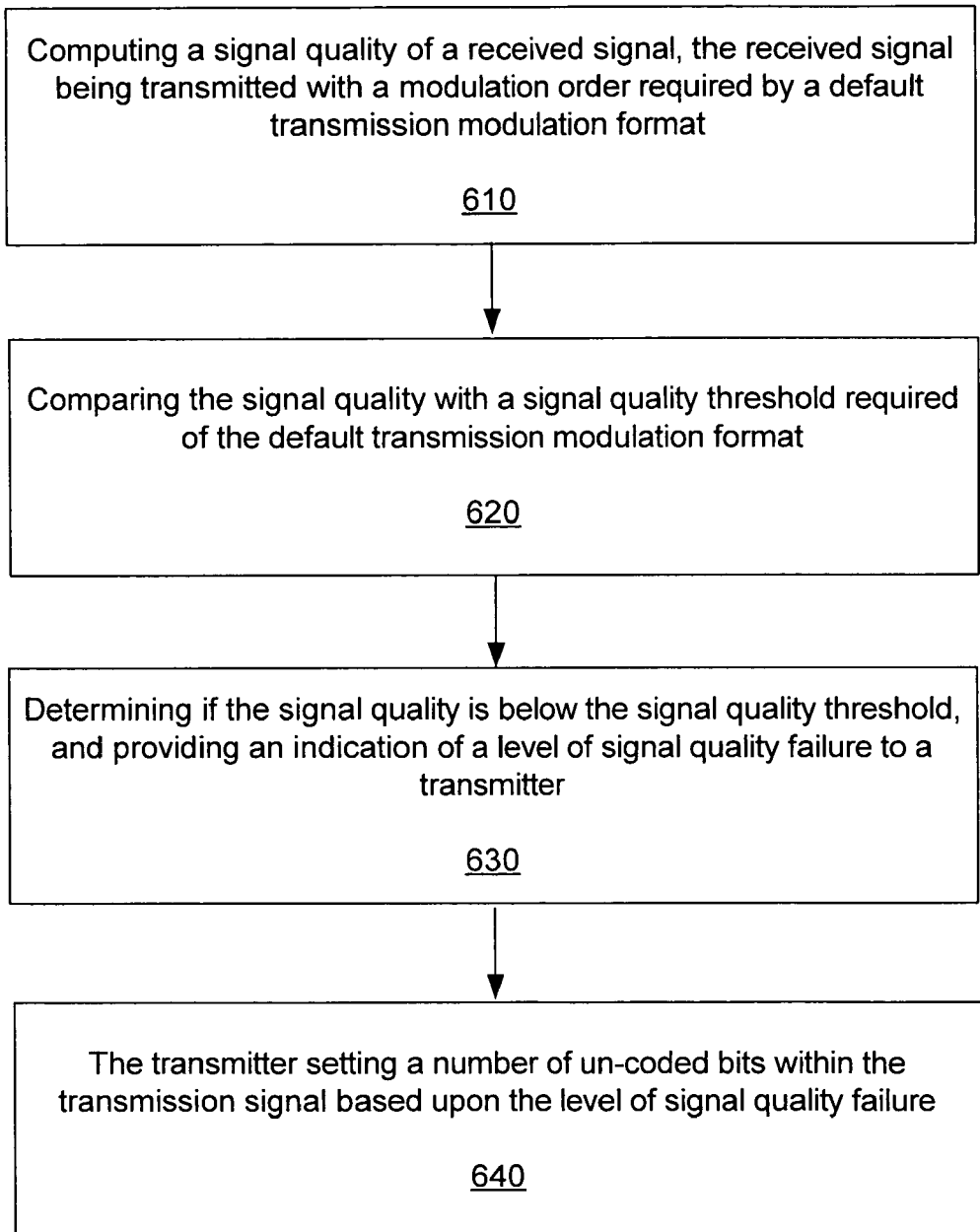
FIG. 6 is a flow chart that includes exemplary steps of a method of high-speed transmission.

FIG. 6 is a flow chart that includes exemplary steps of a method of high-speed transmission. A first step 610 includes computing a signal quality of a received signal, the received signal being transmitted with a modulation order required by a default transmission modulation format. A second step 620 includes comparing the signal quality with a signal quality threshold required of the default transmission modulation format. A third step 630 includes determining if the signal quality is below the signal quality threshold, and providing an indication of a level of signal quality failure to a transmitter. A fourth step 640 includes the transmitter setting a number of un-coded bits within the transmission signal based upon the level of signal quality failure.

As previously described, the default transmission modulation format can be defined by 10GBase-T transmission. A 10GBase-T training sequence can be initiated, allowing computation of a signal quality of a received signal based upon the 10GBase-T training sequence. The signal quality is compared with a signal quality threshold required of the 10GBase-T transmission.

Figure 7:
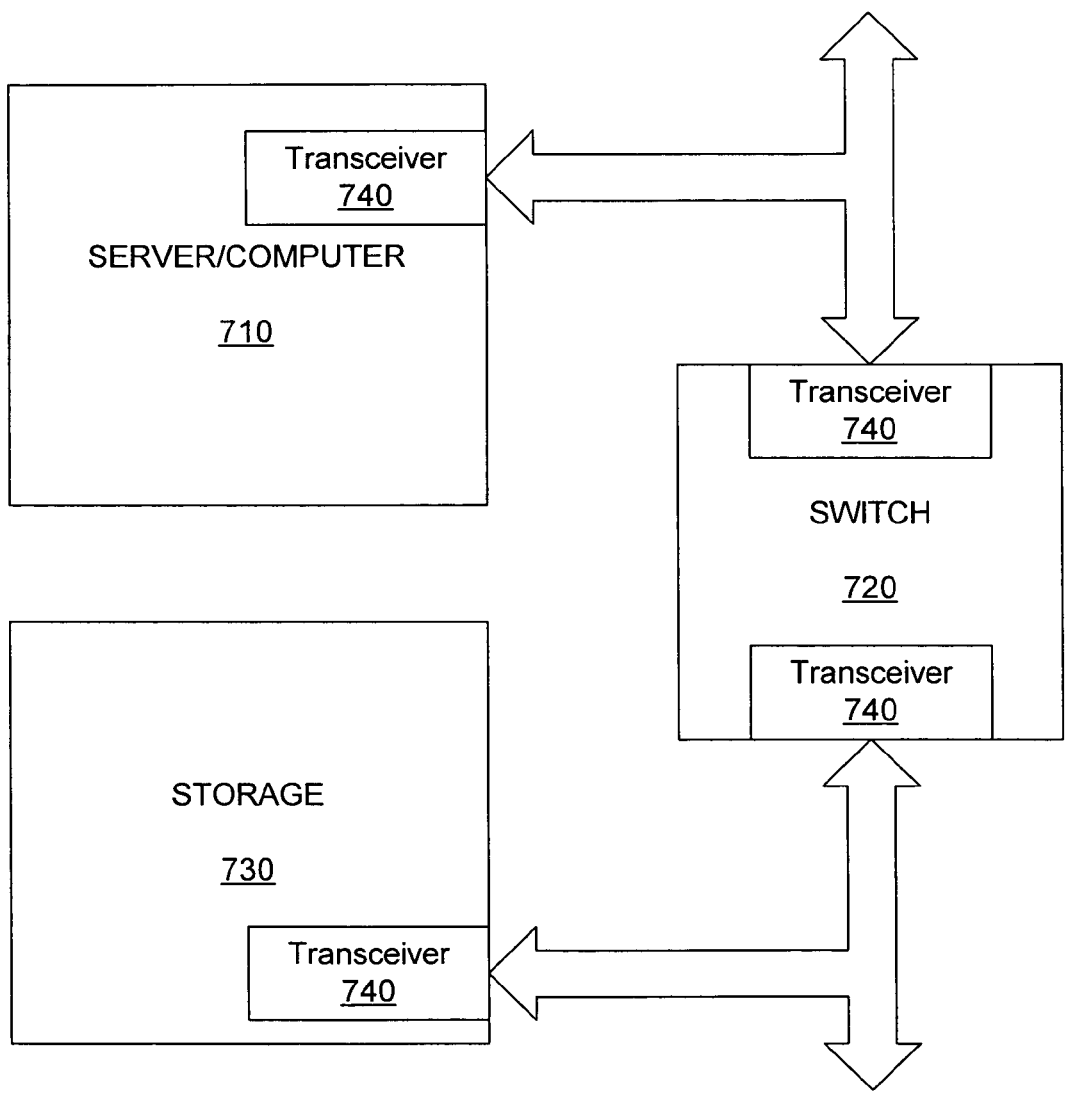
FIG. 7 shows devices connected to an Ethernet network that can include embodiments of the transmitters and receivers.

FIG. 7 shows devices connected to an Ethernet network that can include embodiments of the transmitter and receiver (transceiver 740) configurations having transmission rates that are adapted to the transmission signal quality as have been described. The Ethernet transceivers 730 can be included within a server 710, a switch 720 or a storage device 730. Clearly, other types of devices could use the Ethernet transceivers as well.

Although specific embodiments of the invention have been described and illustrated, the invention is not to be limited to the specific forms or arrangements of parts so described and illustrated. The invention is limited only by the appended claims.

What is claimed:

1. A method of high-speed transmission, comprising: computing a signal quality of a received signal, the received signal being transmitted with a modulation order required by a default transmission modulation format; comparing the signal quality with a signal quality threshold required of the default transmission modulation format; if the signal quality is below the signal quality threshold, providing an indication of a level of signal quality failure to a transmitter; the transmitter setting a number of un-coded bits within the transmission signal based upon the level of signal quality failure, while maintaining a constant number of coded bits, allowing for changes in a transmission data rate while maintaining a constant transmission symbol rate; wherein the number of un-coded bits is 3 bits per two-dimensional modulation symbol if the signal quality is not less than the signal quality threshold, and is reduced by at least ½ bit per modulation symbol dimension if the signal quality is less than the signal quality threshold.

2. The method of claim 1, wherein the default transmission modulation format is 10GBase-T.

3. The method of claim 1, wherein transmission is initiated by a default training sequence.

4. The method of claim 1, wherein no other types of training sequences are initiated than the default training sequence.

5. The method of claim 3, wherein default training sequence is a 10GBase-T training sequence.

6. The method of claim 1, wherein the signal quality is computed by determining at least one of DPSNR, DPMSE, DPPER, BER, FER, received error pdf distribution, decision point signal to decision point cross talk ratio of the received signal.

7. The method of claim 1, wherein the number of un-coded bits is reduced by another ½ bit per modulation symbol dimension for every 3 dB the signal quality is below the signal quality threshold.

8. The method of claim 7, wherein decreasing ½ bit per modulation symbol dimension is achieved by reducing 1 bit on a two-dimensional modulation symbol.

9. The method of claim 7, wherein decreasing ½ bit per modulation symbol dimension is achieved by reducing from $2*n+1$ bits on a two-dimensional modulation symbol to n bits on a one-dimensional modulation symbol.

10. The method of claim 1, wherein the number of un-coded bits is set by decreasing the number of un-coded bits from a default value by ¼ bit per modulation symbol dimension for each 1.5 dB the signal quality is below the signal quality threshold.

11. The method of claim 10, wherein decreasing ¼ bit per modulation symbol is achieved by reducing 1 bit of a four-dimensional modulation symbol.

12. The method of claim 1, wherein the number of un-coded bits is set by decreasing the number of un-coded bits from a default value by 1 bit per modulation symbol dimension for each 6 dB the signal quality is below the signal quality threshold.

13. The method of claim 1, wherein the number of un-coded bit is increased if the signal quality is a predetermined amount greater than a threshold.

14. The method of claim 1, wherein a transmission symbol rate remains constant with changes in the number of un-coded bits.

15. The method of claim 1, wherein common analog processing circuitry, encoding circuitry, and equalizer circuitry is used with varying numbers of un-coded bits.

16. The method of claim 1, further comprising the number of un-coded bits setting a resolution of coefficients of signal processing of at least one of an equalizer, a cross-talk canceller and an echo canceller.

17. The method of claim 1, further comprising the number of un-coded bits setting a number of coefficients of signal processing of at least one of an equalizer, a cross-talk canceller and an echo canceller.

18. A method of 10GBase-T transmission, comprising: initiating a 10GBase-T training sequence; computing a signal quality of a received signal based upon the 10GBase-T training sequence; comparing the signal quality with a signal quality threshold required of the 10GBase-T transmission; if the signal quality is below the signal quality threshold, providing an indication of a level of signal quality failure to a transmitter; the transmitter setting a number of un-coded bits within the transmission signal based upon the level of signal quality failure, while maintaining a constant number of coded bits, allowing for changes in a transmission data rate while maintaining a constant transmission symbol rate; wherein the number of un-coded bits is 3 bits per two-dimensional modulation symbol if the signal quality is not less than the signal quality threshold, and is reduced by at least ½ bit per modulation symbol dimension if the signal quality is less than the signal quality threshold.

19. The method of claim 18, wherein a receiver computes a desired number of un-coded bits and provides the desired number to the transmitter.

20. The method of claim 18, wherein each receiver of bidirectional transmission computes a desired number of un-coded bits for the bidirectional transmission, the smallest desired number of each of both directions of the bidirectional transmission is selected for transmission in both bidirectional transmission directions.

21. The method of claim 18, wherein only 10GBase-T training sequences are initiated.

22. The method of claim 18, wherein the number of un-coded bits is reduced by another ½ bit per modulation symbol dimension for every 3 dB the signal quality is below the signal quality threshold.

23. The method of claim 18, wherein a modulation format of the transmission is DSQ128 if the signal quality not less than the signal quality threshold, the modulation format is QAM64/PAM8 if the signal quality is less than the signal quality threshold by less than 3 dB, the modulation format is QAM32/DSQ32 if the signal quality is at least 3 dB but less than 6 dB below the signal quality threshold, the modulation format is QAM16/PAM4 if the signal quality is at least 6 dB but less than 9 dB below the signal quality threshold.

24. The method of claim 18, wherein a modulation format of the transmission is PAM8 if the signal quality is less than the signal quality threshold by less than 3 dB, the modulation format is PAM4 if the signal quality is at least 3 dB but less than 9 dB.

25. The method of claim 18, wherein the number of un-coded bit is increased if the signal quality is a predetermined amount greater than a threshold.

26. The method of claim 18, further comprising the number of un-coded bits setting a resolution of bits within coefficients of signal processing of at least one of an equalizer, a cross-talk canceller and an echo canceller.

27. The method of claim 18, further comprising the number of un-coded bits setting a number of coefficients of signal processing of at least one of an equalizer, a cross-talk canceller and an echo canceller.

28. A method of 10GBase-T reception, comprising: receiving a 10GBase-T training sequence from a 10GBase-T transmitter; computing a signal quality of a received signal based upon the 10GBase-T training sequence; comparing the signal quality with a signal quality threshold required of the 10GBase-T transmission; if the signal quality is below the signal quality threshold, providing an indication of a level of signal quality failure to the transmitter, thereby setting a number of un-coded bits within transmission signals based upon the level of signal quality failure, while maintaining a constant number of coded bits, allowing for changes in a transmission data rate while maintaining a constant transmission symbol rate; wherein the number of un-coded bits is 3 bits per two-dimensional modulation symbol if the signal quality is not less than the signal quality threshold, and is reduced by at least ½ bit per modulation symbol dimension if the signal quality is less than the signal quality threshold.

29. The method of claim 28, the receiver sets the number of un-coded bit.

30. The method of claim 28, the transmitter sets the number of un-coded bit.

31. The method of claim 28, wherein transmission is initiated by a 10GBase-T training sequence.

32. The method of claim 28, wherein no other types of training sequences are initiated than the default training sequence.

33. The method of claim 28, wherein the signal quality is computed by determining at least one of DPSNR, DPMSE, DPPER, BER, FER, error pdf distribution, decision point signal to decision point cross talk ratio of the received signal.

34. A method of 10GBase-T transmission, comprising: transmitting a 10GBase-T training sequence; obtaining an indication of a transmission signal quality from a receiver of the 10GBase-T training sequence, wherein the indicator of transmission signal quality providing an indication of a level of signal quality failure as compared a signal quality threshold required of the 10GBase-T transmission; setting a number of un-coded bits within transmission signals based upon the level of signal quality failure, while maintaining a constant number of coded bits, allowing for changes in a transmission data rate while maintaining a constant transmission symbol rate; wherein the number of un-coded bits is 3 bits per two-dimensional modulation symbol if the signal quality is not less than the signal quality threshold, and is reduced by at least ½ bit per modulation symbol dimension if the signal quality is less than the signal quality threshold.

35. The method of 10GBase-T transmission of claim 34, wherein only 10GBase-T training sequences are transmitted.

36. The method of claim 34, wherein the number of un-coded bits is reduced by another ½ bit per modulation symbol dimension for every 3 dB the signal quality is below the signal quality threshold.

37. The method of claim 34, wherein a modulation format of the transmission is DSQ128 if the signal quality not less than the signal quality threshold, the modulation format is QAM64/PAM8 if the signal quality is less than the signal quality threshold by less than 3 dB, the modulation format is QAM32/DSQ32 if the signal quality is at least 3 dB but less than 6 dB below the signal quality threshold, the modulation format is QAM16/PAM4 if the signal quality is at least 6 dB but less than 9 dB below the signal quality threshold.

* * * * *